(12) United States Patent
Pearcy et al.

(10) Patent No.: US 9,442,912 B1
(45) Date of Patent: Sep. 13, 2016

(54) ESTIMATING THE NUMBER OF CONTENT ITEMS TO FILL AN ONLINE SPACE BEFORE DISTRIBUTING THE CONTENT ITEMS TO THE ONLINE SPACE

(71) Applicants: Brandon Murdock Pearcy, San Francisco, CA (US); Nathan Peter Lucash, San Francisco, CA (US)

(72) Inventors: Brandon Murdock Pearcy, San Francisco, CA (US); Nathan Peter Lucash, San Francisco, CA (US)

(73) Assignee: Google Inc., Mountain View, CA (US)

( * ) Notice: Subject to any disclaimer, the term of this patent is extended or adjusted under 35 U.S.C. 154(b) by 963 days.

(21) Appl. No.: 13/627,272

(22) Filed: Sep. 26, 2012

(51) Int. Cl.
*G06F 17/00* (2006.01)
*G06F 17/24* (2006.01)
*G06F 17/21* (2006.01)
*G06F 17/30* (2006.01)

(52) U.S. Cl.
CPC ............. *G06F 17/243* (2013.01); *G06F 17/24* (2013.01); *G06F 17/212* (2013.01); *G06F 17/248* (2013.01); *G06F 17/3089* (2013.01)

(58) Field of Classification Search
CPC .. G06F 17/212; G06F 17/243; G06F 17/248; G06F 17/24; G06F 17/3089
See application file for complete search history.

(56) References Cited

U.S. PATENT DOCUMENTS

| | | | |
|---|---|---|---|
| 5,379,229 A | 1/1995 | Parsons et al. | |
| 5,553,217 A * | 9/1996 | Hart | G06K 15/02 715/209 |
| 5,555,369 A | 9/1996 | Menendez et al. | |
| 5,956,737 A * | 9/1999 | King | G06F 17/211 707/E17.121 |
| 6,253,220 B1 * | 6/2001 | Le Beux | G06T 11/60 345/635 |
| 6,820,277 B1 | 11/2004 | Eldering et al. | |
| 6,907,566 B1 | 6/2005 | McElfresh et al. | |
| 7,263,668 B1 | 8/2007 | Lentz | |
| 7,409,635 B2 * | 8/2008 | Epstein | G06F 17/217 715/243 |
| 7,594,189 B1 | 9/2009 | Walker et al. | |
| 7,694,221 B2 | 4/2010 | Fortes | |
| 7,831,907 B2 * | 11/2010 | Balinsky | G06F 17/212 382/112 |
| 7,890,882 B1 | 2/2011 | Nelson | |
| 7,904,799 B1 | 3/2011 | Underwood et al. | |
| 7,983,959 B2 | 7/2011 | Chickering et al. | |
| 8,001,105 B2 | 8/2011 | Bolivar et al. | |

(Continued)

FOREIGN PATENT DOCUMENTS

| | | |
|---|---|---|
| EP | 2 068 251 A2 | 10/1995 |
| JP | 2012-073863 A | 4/2012 |

(Continued)

OTHER PUBLICATIONS

Office Action on U.S. Appl. No. 13/724,391 dated Jan. 13, 2015.

(Continued)

*Primary Examiner* — Cesar Paula
*Assistant Examiner* — David Faber
(74) *Attorney, Agent, or Firm* — Foley & Lardner LLP; John D. Lanza (57) ABSTRACT

Aspects and implementations described herein are directed to systems and methods of distributing online content. The distribution of online content may include receiving a request for content items for a designated space having a size. A data processing system may estimate a number of content items for the space given the size. A second number of content items, greater than the estimated number, may be provided in response to the request. Data may be received indicative of a third number of content items rendered in the space, which may be equal to or less than the second number, and the content items may be selected in an online auction.

17 Claims, 5 Drawing Sheets

(56) References Cited

U.S. PATENT DOCUMENTS

| | | |
|---|---|---|
| 8,086,957 B2 | 12/2011 | Bauchot et al. |
| 8,090,706 B2 | 1/2012 | Bharat |
| 8,196,162 B2 | 6/2012 | Van De Klashorst |
| 8,214,454 B1 | 7/2012 | Barnes et al. |
| 8,335,712 B1 | 12/2012 | Crucian et al. |
| 8,577,181 B1 | 11/2013 | Badros et al. |
| 8,738,448 B2 | 5/2014 | Zhang |
| 2004/0073873 A1* | 4/2004 | Croney ............... G06T 3/4092 715/273 |
| 2004/0148274 A1 | 7/2004 | Warnock et al. |
| 2004/0267965 A1 | 12/2004 | Vasudevan et al. |
| 2005/0021403 A1 | 1/2005 | Ozer et al. |
| 2005/0028098 A1* | 2/2005 | Harrington ........... G06F 17/211 715/234 |
| 2005/0041647 A1 | 2/2005 | Stinnie |
| 2006/0064630 A1 | 3/2006 | Balinsky |
| 2006/0107204 A1 | 5/2006 | Epstein |
| 2007/0162844 A1 | 7/2007 | Woodall et al. |
| 2007/0174291 A1 | 7/2007 | Cooper et al. |
| 2007/0226626 A1* | 9/2007 | Yap .................... G06F 17/3089 715/733 |
| 2008/0022197 A1* | 1/2008 | Bargeron ............. G06F 17/211 715/246 |
| 2008/0256439 A1* | 10/2008 | Boreham ............. G06F 17/211 715/246 |
| 2008/0262912 A1 | 10/2008 | Gargi |
| 2008/0262913 A1 | 10/2008 | Reitz et al. |
| 2008/0270890 A1 | 10/2008 | Stern |
| 2009/0012863 A1 | 1/2009 | Saephan |
| 2009/0012905 A1 | 1/2009 | Mawani et al. |
| 2009/0063377 A1* | 3/2009 | Brady ................ G06Q 30/0244 706/20 |
| 2009/0067753 A1* | 3/2009 | Hanechak ............. G06T 3/0006 382/298 |
| 2009/0070211 A1* | 3/2009 | Gonen .................. G06Q 30/02 705/14.1 |
| 2009/0085921 A1* | 4/2009 | Do .......................... G09G 5/14 345/543 |
| 2009/0089668 A1* | 4/2009 | Magnani ........... G06F 17/30905 715/273 |
| 2009/0150253 A1 | 6/2009 | Williams et al. |
| 2009/0171920 A1* | 7/2009 | Wade ................ G06F 17/30864 |
| 2009/0172730 A1 | 7/2009 | Schiff et al. |
| 2009/0187535 A1 | 7/2009 | Warnock et al. |
| 2009/0216364 A1 | 8/2009 | Grissom |
| 2009/0234713 A1* | 9/2009 | Bi .......................... G06Q 30/02 705/14.54 |
| 2009/0307188 A1 | 12/2009 | Oldham et al. |
| 2010/0042749 A1 | 2/2010 | Barton |
| 2010/0057569 A1 | 3/2010 | Cantelmo et al. |
| 2010/0107061 A1* | 4/2010 | Ramakrishnan ...... G06F 17/212 715/256 |
| 2010/0114696 A1 | 5/2010 | Yang |
| 2010/0115064 A1 | 5/2010 | Tsun et al. |
| 2010/0198694 A1 | 8/2010 | Muthukrishnan |
| 2010/0211467 A1* | 8/2010 | Ramanathan ..... G06F 17/30899 705/14.72 |
| 2011/0007096 A1 | 1/2011 | Miyano |
| 2011/0035345 A1 | 2/2011 | Duan et al. |
| 2011/0119124 A1 | 5/2011 | Pradeep et al. |
| 2011/0145730 A1 | 6/2011 | Zhou |
| 2011/0153421 A1 | 6/2011 | Novikov et al. |
| 2012/0159314 A1* | 6/2012 | Schrier ............. G06F 17/30905 715/252 |
| 2012/0278704 A1* | 11/2012 | Ying .................... G06F 17/2247 715/243 |
| 2012/0310735 A1 | 12/2012 | Kniaz et al. |
| 2013/0018734 A1* | 1/2013 | Perret .................... G06Q 30/02 705/14.73 |
| 2013/0024757 A1* | 1/2013 | Doll ....................... G06Q 50/01 715/204 |
| 2013/0159841 A1 | 6/2013 | Yokoyama et al. |
| 2013/0305144 A1* | 11/2013 | Jackson ............... G06F 17/217 715/246 |
| 2014/0006174 A1* | 1/2014 | Pearcy .................. G06Q 30/02 705/14.73 |
| 2014/0095514 A1 | 4/2014 | Filev et al. |

FOREIGN PATENT DOCUMENTS

| | | |
|---|---|---|
| WO | WO-02/27574 A1 | 4/2002 |
| WO | WO-2006/055751 A2 | 5/2006 |
| WO | WO-2009/111123 A1 | 9/2009 |
| WO | WO-2010/088479 A2 | 8/2010 |
| WO | WO-2011/119142 | 9/2011 |

OTHER PUBLICATIONS

Office Action on U.S. Appl. No. 13/724,391 dated Aug. 13, 2014.
PCT International Search Report/Written Opinion for PCT/US2013/074276, DTD Mar. 28, 2014, 9 pages.
US Office Action on U.S. Appl. No. 13/725,302 mailed Oct. 28, 2014, 24 pages.
International Search Report and Written Opinion mailed Mar. 27, 2014 in PCT Application No. PCT/US2013/074279 (11 pages).
US Notice of Allowance on U.S. Appl. No. 13/659,520 dtd Jul. 6, 2015.
US Notice of Allowance on U.S. Appl. No. 13/724,391 DTD Jul. 7, 2015, 11 pgs.
US Advisory Action on U.S. Appl. No. 13/725,302, dtd May 26, 2015, 3 pgs.
US Office Action on U.S. Appl. No. 13/627,334 DTD May 18, 2015.
US Notice of Allowance on U.S. Appl. No. 13/659,520 DTD Mar. 13, 2015, 12 pgs.
US Office Action on U.S. Appl. No. 13/627,334, dtd Nov. 18, 2014, 18 pages.
US Office Action on U.S. Appl. No. 13/725,302 DTD Mar. 20, 2015, 27 pgs.
US Office Action on U.S. Appl. No. 13/725,302 dtd Oct. 28, 2014, 24 pages.
US Office Action on U.S. Appl. No. 13/725,302, dated Jun. 4, 2014, 21 pages.
US Office Action on U.S. Appl. No. 13/725,302 DTD Aug. 19, 2015.
US Notice of Allowance on U.S. Appl. No. 13/627,334 DTD Sep. 25, 2015, 7 pgs.
US Notice of Allowance on U.S. Appl. No. 13/627,334 DTD Jan. 8, 2016, 8 pgs.
US Office Action on U.S. Appl. No. 13/725,302 DTD Feb. 5, 2016, 27 pgs.

\* cited by examiner

ESTIMATING THE NUMBER OF CONTENT ITEMS TO FILL AN ONLINE SPACE BEFORE DISTRIBUTING THE CONTENT ITEMS TO THE ONLINE SPACE

BACKGROUND

In a networked environment such as the Internet, entities such as companies can provide information for display on web pages. The web pages can include text, video, or audio information provided by the entities via a web page server. Additional or alternative content items such as advertisements may be provided by third parties (such as advertisers) for display on the web pages together with the main content. Thus, a user viewing a web page can access the information that is the subject of the web page, as well as third party advertisements that may or may not be related to the subject matter of the web page.

SUMMARY

At least one aspect is directed toward a method of distributing content items to a web page. A request for content items may include information specifying a dimensional size of a space in which the content items will be rendered. The number of content items for rendering in the space may be estimated based on measurement results of rendering content items on a multiple user devices having a multiple configurations. A set of content items, greater than the estimate, may be provided in response to the request. Data indicative of the number of content items that were actually rendered in the space may be received. The number of rendered content items may be less than or equal to the number of provided content items and may be selected via an online auction.

In another aspect, a method may include sending a request for a web page that has a space in which content items may be rendered. The space may include a dimensional size. A set of content items may be received. A number of content items from the set may be selected based, at least in part, on the dimensional size of the space of the web page that the content items will be rendered in. The number of selected content items may be less than or equal to the number of content items in the set. Data indicative of the number of content items selected may be sent.

In still another aspect, a computer-readable storage device storing instructions that when executed by one or more data processors, cause the one or more data processors to perform operations for receiving a request for content items, the request including information specifying a dimensional size of a space in which the content items will be rendered, providing a set of content items for the space, and receiving data indicating the number of content items from the set that were actually rendered in the space. The number of rendered content items may be less than the number of provided content items.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Systems and methods described herein are directed to distributing online content items to web page spaces (e.g., slots).

In an advertising environment, a content item slot may be an area of a web page or application that has been made available for displaying content items. Different content item slots may represent different sections of a web page or application, or different placements for content within a single web page or application. A content item slot can display a plurality of types of content, including, e.g., an advertisement, video, images, and text.

Knowledge of the size of a content item (e.g., ad) may be needed for determining how many content items to request to fill a space of a specified size (e.g., slot) on a web page. The exact space needed may depend on the precise textual content in a given content item, and may depend on the platform on which the content item is being displayed or viewed (e.g., different web browser versions may have different rendering logics), the fonts being used, user device screen resolution, the layout of the various components of the ad, etc. Knowing the space needed for content items may help optimize monetization of limited space on web pages without truncating the ads or may help optimize the appearance of the content items (e.g., a content item can be displayed with a larger font size) to users.

As used herein, a "user" or a "user identifier" may refer to an identifier of an individual user, a user device, a user browser, etc., and does not necessarily refer to the actual individual user. Users may opt out of data collection, and users may opt in to provide additional demographic data for improved online experience. The identifiers associated with user data may be anonymized and not connected to user names or actual identities, or other sensitive information. Similarly, user browsers and devices may not be connected to actual identifies of the users.

In an advertising environment, it may be needed to estimate, a priori, how many ads will fit in a given rectangle of publisher-allocated space. In many cases, the actually-returned ads are considerably smaller than the estimated sizes. Some of the described implementations may request more ads than initially specified or estimated.

The described implementations may thus over-request or over-allocate ads to a given request. These ads may initially be marked as "unviewed impressions" until the publisher reports exactly how many ads were successfully displayed, and the successfully-displayed ads may be labeled as "viewed impressions." This distinction of unviewed versus viewed impressions may be useful to track how effective a given ad may be, e.g., to assess their click-through rate (CTR). As such, ads that are ultimately not viewed may not have their CTR penalized as a result.

The rendering of the ads may be improved according to some of the described implementations. For example, for some given parameters for selecting relevant content items, the parameters may be requested to be adjusted according to the predicted CTR (pCTR) based on some of the described implementations.

In some implementations, instead of over-allocating ads in a single request, an ad provider could instead decide to daisy-chain (or pipeline) ad requests to be sent if the previous response did not fill-to-capacity the allocated ad area.

Advantageously, at least some of the described implementations allow an ad network to maximize the number of potential ad impressions for a given area of space, particularly where returned ads are smaller than expected.

The described implementations can be applied not only to advertising, but may be applied to search results or any other content rendering systems. For example, parameters of a browser can be gathered, and fonts can be measured, and these factors can be taken into account in rendering digital books, displaying search results page (e.g., how many lines are shown on one page; how to fold search result pages, etc.). The methods may be particularly useful for devices with limited display spaces, such as mobile phones, and tablet computers.

Figure 1:
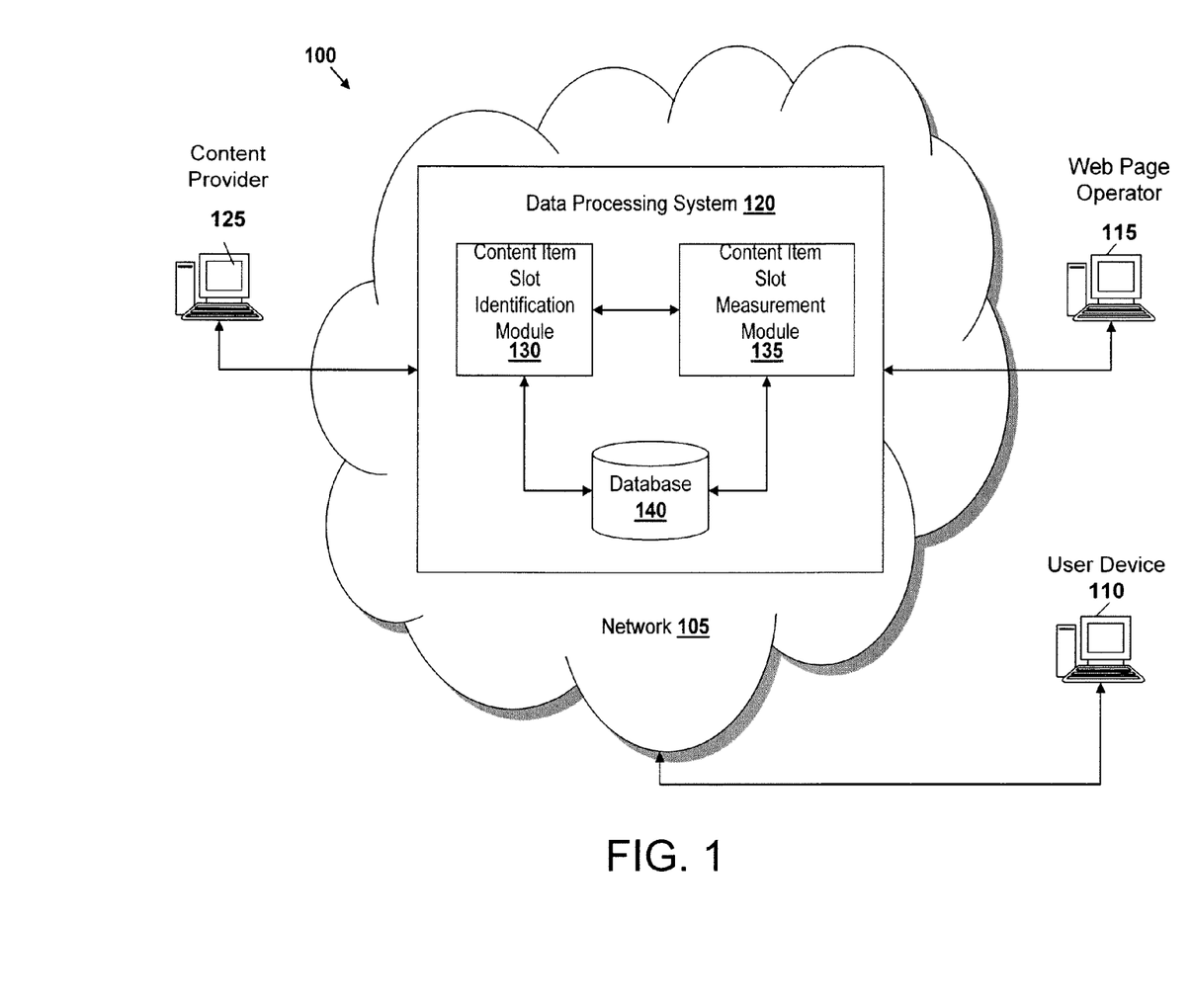
FIG. 1 is an illustration of an example system for distributing content to a web page via a computer network, according to some implementations.

FIG. 1 illustrates an example system 100 for serving content items to a web page via a network 105 according to some implementations of the present disclosure. The network 105 can include computer networks such as the Internet, local, metro, or wide area networks (WAN), intranets, and other communication networks such as mobile telephone networks. The network 105 can be used to access web pages that can be displayed on at least one user device 110, such as a laptop, desktop, tablet, personal digital assistants, smart phones, smart TVs, or portable computers. For example, via the network 105 a user device 110 can access web pages provided by the web page operator 115. In this example, a web browser of the user device 110 can access a web server of the web page operator 115 to retrieve a web page for display on a monitor of the user device 110. The web page operator 115 may include an entity that can operate a web page as well as the web page server that can communicate with the network 105 to make the web page available to the user device 110.

The system 100 may include at least one data processing system 120. The data processing system 120 can include at least one processing module or logic device to communicate via the network 105 with at least one content provider 125 and at least one web page operator 115. The data processing system 120 can optionally include at least one content item slot identification module 130, at least one measurement module 135, and at least one database 140. In some implementations, the data processing system 120 may include a content placement server.

In some implementations, the web page operator 115 can request content from the data processing system 120. The data processing system 120 may request content from the content provider 125 in response to this request for content.

The data processing system 120 may select the content to provide to web page operator 115 based on a plurality of factors. In some other implementations, the data processing system 120 may instruct the content provider 125 to directly provide content to the web page operator 115. In some implementations, the data processing system 120 may retrieve one or more content items, such as a plurality of advertisements, from content provider 125 and store the content items in the database 140.

In some implementations, the data processing system 120 may obtain ad slot information via the computer network 105. The ad slot may be on the web page being viewed by the user device 110. The web page may be associated with the web page operator 115. For example, the data processing system 120 can obtain ad slot information such as at least one ad slot parameter, including, e.g., a unique ad slot id, ad slot position, browser document size, or ad slot length and width.

An ad slot code may be an identifier used by a data processing system 120 and/or an advertisement placement server. The ad slot code may be tied to various web operator and/or publisher settings. In some implementations, the data processing system 120 may use various other parameters to generate a unique ad slot id, including, e.g., the ad slot's location in the web page's document object model (DOM) tree.

In some implementations, the data processing system 120 may include an interface configured to receive a request via the network 105 to provide content for display in an ad slot of a web page. The data processing system 120 may receive the request in real-time, e.g., between the time that the user device 110 requests access to a web page of the web page operator 115 and the time that the web page operator 115 displays the web page on the user device 110.

In some implementations, the measurement module 135 can measure or otherwise obtain at least one parameter associated with the ad slot, and/or the results of rendering one or more ads (such as whether the one or more ads are truncated in the ad slot). For example, the measurement module 135 can inject a script into content that is being provided to the web page operator for display on the web page. In some implementations, the measurement module 135 can append a script into a rich media advertisement. A rich media advertisement may include, e.g., an HTML advertisement, expandable advertisement, above-the-fold advertisement, or other multimedia advertisements that include one or more of text, audio, still images, animation, video, or interactive content. The script may be a Java script. The script can execute at the web page server of the web page, for example, to make the measurements.

In some other implementations, the measurement module 135 can receive at least one parameter of the ad slot. For example, a web page server of the web page operator 115 can execute the Java script to determine one or more parameters of the ad slot. The Java script may combine the determined parameter with other available data and report it to the ad slot measurement module 135 via the network 105. For example, the ad slot measurement module 135 may receive the unique ad slot id of the ad slot and position data.

The system 120 can include a database 140 that stores data about the ad slot. In some implementations, the database 140 can store the measurement results determined by the measurement module 135. In some other implementations, the database 140 may store the content items provided by content provider 125. For example, the database 140 may store the advertisements provided to the web page operator 115. The database 140 may store the content items with the injected scripts.

The system 100 can include a database 140 designed and constructed to organize, store, retrieve, and transmit a plurality of data. The database 140 can be configured to interact with any component of system 100, data processing system 120, ad slot identification module 130, measurement module 135, content provider 125, web page operator 115, or user device 110.

Figure 2:
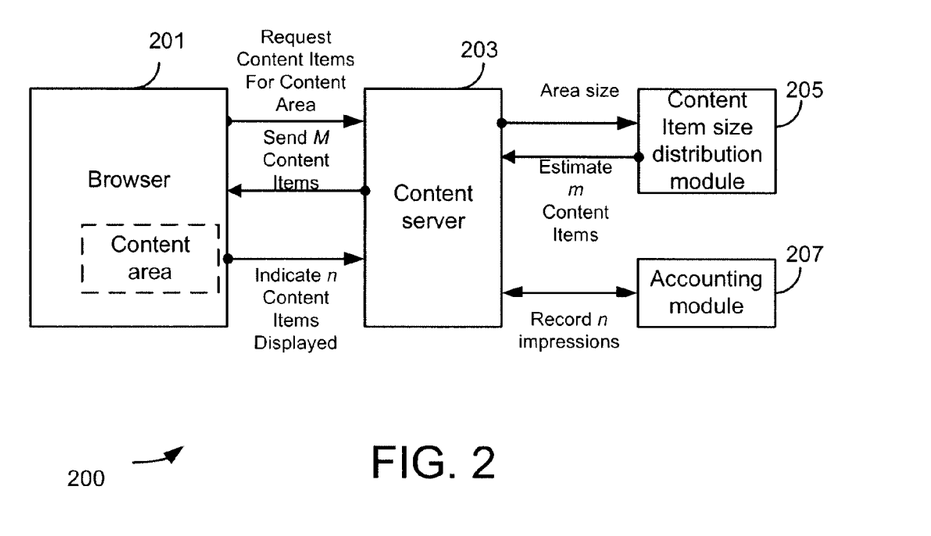
FIG. 2 is a block diagram illustrating an example system configured to over request content items, according to some implementations.

FIG. 2 is a block diagram illustrating a system 200 according to some of the described implementations. A browser 201 may request content items (e.g., ads) from a content server 203, for a space (e.g., an ad area or slot) of the browser 201. A content server 203 may send information regarding the content item area, such as the size of an ad area, to a content item size distribution module 205. Content item size distribution module 205 may estimate that a number of m content items may fit into the specified ad area in the browser 201 based on a size of the content item area and the size of one or more content items. Based on the estimated number m, content server 203 may send a different number of M (>m) content items to the browser 201. By over-requesting M content items, the system 200 may advantageously fill the content item area to capacity, such as in a case where the received content items may be smaller than the estimate and the m content items cannot fill all the content item area.

Figure 3:
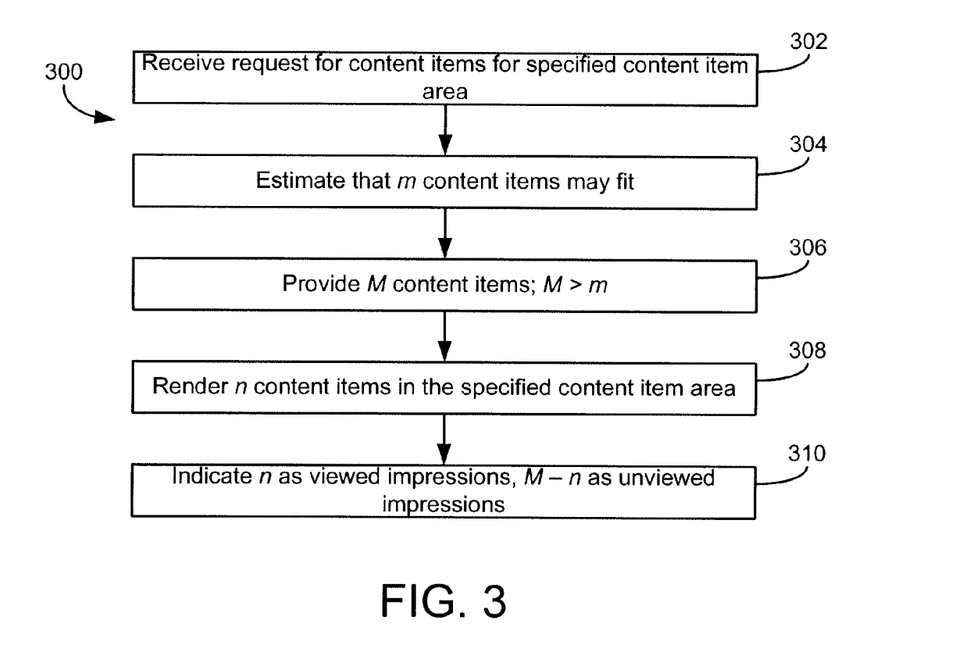
FIG. 3 is a flowchart illustrating an example method of distributing content items to a web page via a computer network, according to some implementations.

FIG. 3 illustrates a flow diagram of a method 300 for distributing content items to a web page via a computer network in accordance with some illustrative implementations. The method 300 may include an operation 302 of receiving, at a data processing system via the computer network, a request for one or more content items (e.g., ads) for display in a specified area (e.g., an slot of a web page). For example, at least one processing module of a data processing system can receive, from a web page server, a request for content items (e.g., advertisements) to provide together with the main content of the web page for display to a user device. In some implementations, the request may be sent from an entity (e.g., a web page operator) to place content on their web page. The request may be transmitted via a network and received by the data processing system such as a content placement server. In some implementations, the content items may be received from a content provider and provided to the web page operator.

In some implementations, the request for content may be responsive to one or more actions made by a user device. For example, a user device may request access to a web page hosted by a web page operator. The web page may have one or more content item slots that need content items. The web page operator may request one or more content item (e.g., advertisements) from the system 120 that are suitable for the content item slot.

In some implementations, the request may be received by an advertisement placement server. The request may be made by the publisher of a web page. In some implementations, the request may be made in real-time, e.g., after a user device requests access to a web page and prior to displaying the web page. A user device may be represented by a user indicator for a browsing session. For example, a user identifier may be a cookie that identifies a browsing session, browser, or computing device that includes one or more processing modules.

In some implementations, the request for content may include additional information, such as information about the advertisement slot. In some implementations, the information may include a unique ad slot id, data about parameters related to the advertisement slot, data used to retrieve relevant advertisements, or a dimensional size of the space of the advertisement slot. In some implementations, the request may lack certain data. For example, the request may lack data about parameters of the advertisement slot, including, e.g., the unique advertisement slot id, parameter data, position data, or style data.

The method 300 may include estimating that a number of m content items may fit in the specified area (block 304). The estimate may be based on, for example, retrieved data about one or more ad slot parameter, and typical ad sizes. In some implementations, wherein the estimating may be based on measurement results of rendering content items from a plurality of user devices with a plurality of configurations. The measurement results may include, for example, a parameter of the space, a parameter of the content item, a dimension of a user interface (UI), or a parameter of the plurality of configurations. In some implementations, the estimating may involve determining a probabilistic distribution of a representation of space needed for the content items, e.g., how many content items can fit in the space. The probabilistic distribution may represent a percentage of content items that are truncated when displayed in the slot. The probability distribution may be determined, for example, through statistics obtained from experimenting with user interface (UI) dimensions on the user devices.

Method 300 may include operations associated with receiving at least one content item slot parameter. For example, at least one of a parameter about one or more content item slots, the web page, web browser, and user device may be received. The parameter data may be received via a URL or any other means of transmitting information from a web page operator to the system 100 via a computer network 105. In some implementations, the parameter data may include one or more identifiers, including, e.g., the ad slot code of the ad slot. In some other implementations, the parameter data may be combined with other previously gathered data.

Method 300 may include providing a number of M content items, where M>m (block 306). In some implementations, the M content items may be pipelined for rendering in the space. Method 300 may include rendering, to a web page server of the web page via the computer network, a number of n of the M content items for display in the specified area (block 308), where n≤M. The n content items may be selected in an online auction, based on bids received from content providers and/or a performance metric of the advertisements. For example, the content items may comprise advertisements and a performance metric of the advertisements may be determined based on the n advertisements actually rendered in the space. That is, the number of impressions is calculated based on the n advertisements, which exclude the M−n unviewed advertisements. As such, the number of a plurality of content items in the slot may be maximized, and the web page space may be optimally monetized. In some instances, the n number of advertisements may be based on optimizing an appearance of a content item based on the probabilistic distribution and/or maximizing the number of content items based on the probabilistic distribution. In other instances, the n number of advertisements may be based on optimizing an appearance of a content item based on a dimensional size of a space for an advertisement slot and/or maximizing the number of content items based on a dimensional size of a space for an advertisement slot.

In some implementations, block 308 may include an operation of selecting a rich media advertisement for the content item slot. The rich media advertisement may be selected based on one or more advertisement criteria received from the advertisement request. For example, block 308 may include selecting the advertisement based on the content of the web page, including, e.g., keywords associated with the web page, semantic concepts, or content verticals (categories). In some other implementations, block 308 may include selecting the advertisement based on characteristics or past browsing behavior of the user identifier.

Multiple (e.g., n) content items may be displayed within a single slot at the same time. In some implementations, block 308 may include selecting one or more advertisements for display based, at least in part, on an online advertisement bidding process. For example, a plurality of online advertisers may make a bid in an online auction for certain keywords. If one or more of those keywords are associated with the ad request for a web page, then the content placement server may be more likely to select an advertisement belonging to the highest bidder of one or more of those keywords. In one example, this advertisement may correspond to a rich media advertisement, including, e.g., an HTML advertisement, expandable advertisement, above-the-fold advertisement, or other multimedia advertisements that include one or more of text, audio, still images, animation, video, or interactive content. In another example, the content placement server may select a non-rich media advertisement, e.g., an advertisement that consists of basic text.

The method 300 may include indicating the number n as viewed impressions, and M−n as unviewed impressions (block 310). According to some implementations, the M−n unviewed impressions are excluded from cost calculations. In some implementations, an indication of content items may include an indication of which specific content items were actually rendered.

In some implementations, method 300 can include the operations of selecting a parameter-dependent advertisement based on an advertisement selection criteria. Ad selection criteria may include, e.g., interest categories, demographics, geography, semantic concepts, or content verticals. Ad criteria may include the type of ad slot. In some implementations, method 300 can include the act of a content provider selecting their content to an ad slot that has a parameter corresponding to a certain type of ads. For example, an advertiser may select their advertisements to ad slots that have parameters corresponding to a certain type of ads. The advertiser may select ad slots that are capable of showing expandable advertisements by bidding on expandable ad slots and selecting to have their advertisement displayed on an expandable advertisement. In another example, an advertiser may select above-the-fold ad slots by bidding on above-the-fold ad slots and having their advertisements displayed on an above-the-fold ad slot.

Figure 4:
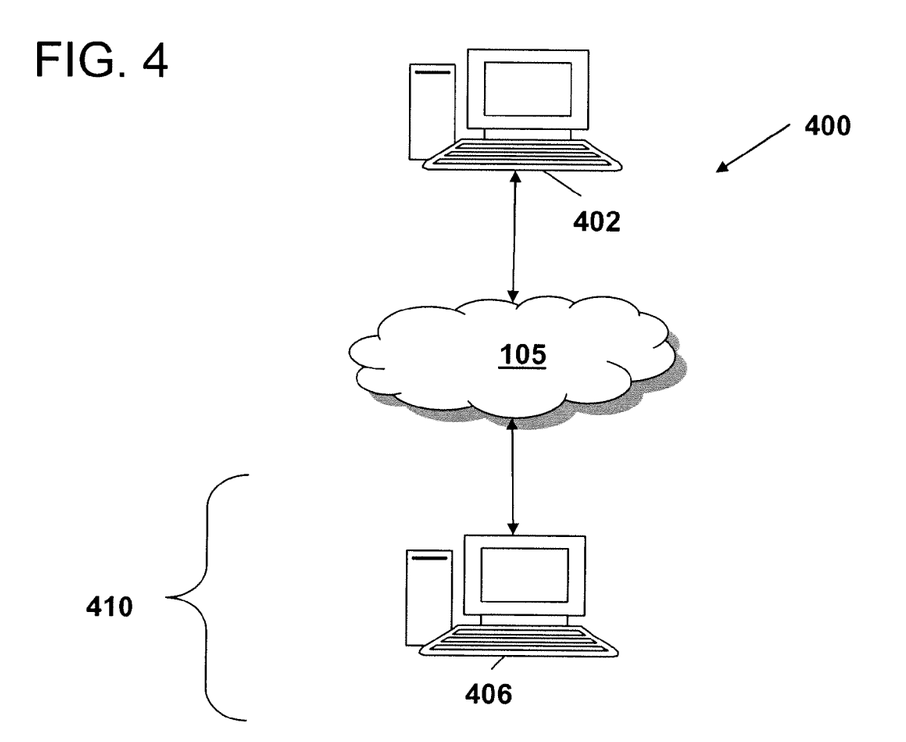
FIG. 4 shows an illustration of an example network environment comprising client machines in communication with remote machines in accordance with some implementations.

The system 100 and its components may include hardware elements, such as one or more processors, logic devices, or modules. FIG. 4 illustrates an example implementation of a network environment 400, in which the system 100 and method 300 can operate. The network environment 400 may include one or more clients 402 that can be referred to as local machine(s) 402, client(s) 402, client node(s) 402, client machine(s) 402, client computer(s) 402, client device(s) 402, endpoint(s) 402, or endpoint node(s) 402) in communication with one or more servers 406 that can be referred to as server(s) 406, node 406, or remote machine(s) 406) via one or more networks 105. In some implementations, a client 402 has the capacity to function as both a client node seeking access to resources provided by a server and as a server providing access to hosted resources for other clients 402.

Although FIG. 4 shows a network 105 between the clients 402 and the servers 406, the clients 402 and the servers 406 may be on the same network 105. The network 105 can be a local-area network (LAN), such as a company Intranet, a metropolitan area network (MAN), or a wide area network (WAN), such as the Internet or the World Wide Web. In some implementations, there may be multiple networks 105 between the clients 105 and the servers 406. For example, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, the system 100 may include multiple, logically-grouped servers 406. In one of these implementations, the logical group of servers may be referred to as a server farm or a machine farm 410. In another of these implementations, the servers 406 may be geographically dispersed. In other implementations, a machine farm 410 may be administered as a single entity. In still other implementations, the machine farm 410 includes a plurality of machine farms 410. The servers 406 within each machine farm 410 can be heterogeneous—one or more of the servers 406 or machines 406 can operate according to one type of operating system platform.

In some implementations, servers 406 in the machine farm 410 may be stored in high-density rack systems, along with associated storage systems, and located in an enterprise data center. In this implementation, consolidating the servers 406 in this way may improve system manageability, data security, the physical security of the system, and system performance by locating servers 406 and high performance storage systems on localized high performance networks. Centralizing the servers 406 and storage systems and coupling them with advanced system management tools allows more efficient use of server resources.

The servers 406 of each machine farm 410 do not need to be physically proximate to another server 406 in the same machine farm 410. Thus, the group of servers 406 logically grouped as a machine farm 410 may be interconnected using a wide-area network (WAN) connection or a metropolitan-area network (MAN) connection. For example, a machine farm 410 may include servers 406 physically located in different continents or different regions of a continent, country, state, city, campus, or room. Data transmission speeds between servers 406 in the machine farm 410 can be increased if the servers 406 are connected using a local-area network (LAN) connection or some form of direct connection. A heterogeneous machine farm 410 may include one or more servers 406 operating according to a type of operating system, while one or more other servers 406 execute one or more types of hypervisors rather than operating systems. In these implementations, hypervisors may be used to emulate virtual hardware, partition physical hardware, virtualize physical hardware, and execute virtual machines that provide access to computing environments.

Management of the machine farm 410 may be de-centralized. For example, one or more servers 406 may comprise components, subsystems and modules to support one or more management services for the machine farm 410. In one of these implementations, one or more servers 406 provide functionality for management of dynamic data, including techniques for handling failover, data replication, and increasing the robustness of the machine farm 410. Each server 406 may communicate with a persistent store and, in some implementations, with a dynamic store.

Server 406 may include a file server, application server, web server, proxy server, appliance, network appliance, gateway, gateway, gateway server, virtualization server, deployment server, secure sockets layer virtual private network ("SSL VPN") server, or firewall. In some implementations, the server 406 may be referred to as a remote machine or a node.

The client 402 and server 406 may be deployed as or executed on any type and form of computing device, such as a computer, network device or appliance capable of communicating on any type and form of network and performing the operations described herein.

Browser 201 may indicate that a number of n content items are actually displayed. The number n may be smaller than or equal to M The number n may be larger than, equal to, or smaller than m. Content server 203 may send this information to an accounting module 207, which may log n impressions, based on which a cost of the content items may be determined.

Figure 5:
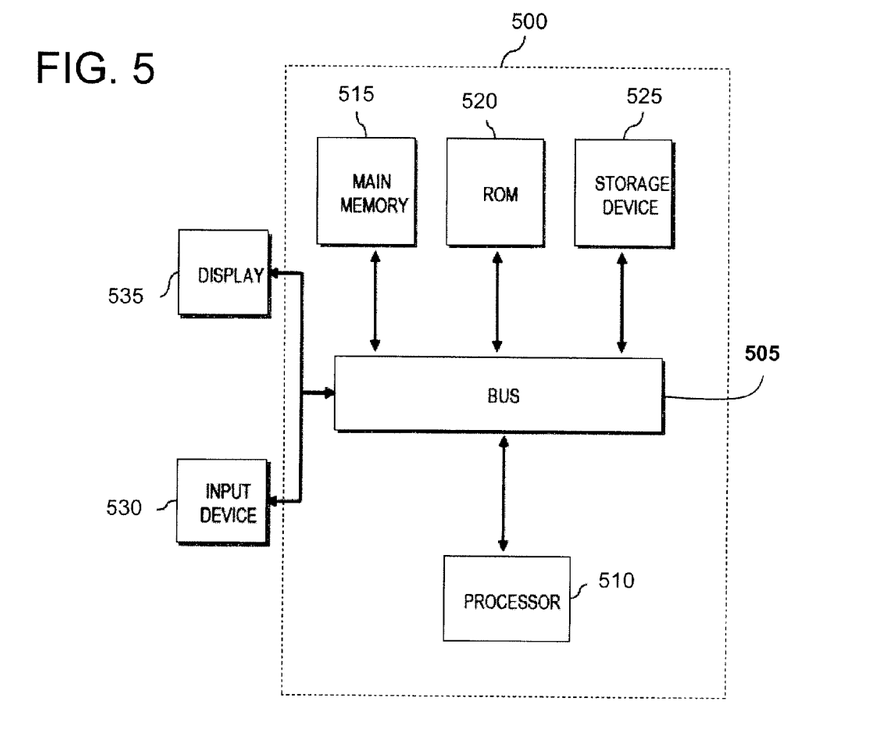
FIG. 5 is a block diagram illustrating an example architecture for a computer system that may be employed to implement various elements of the systems and methods in accordance with some implementations.

FIG. 5 is a block diagram of a computing system or device 500 in accordance with some illustrative implementations. The computing system or device 500 can be used to implement the system 100, user device 110, web page operator 115, data processing system 120, content provider 125, ad slot identification module 130, ad slot measurement module 135, and database 140. The computing system 500 may include a bus 505 or other communication component for communicating information and a processor 510 or processing module coupled to the bus 505 for processing information. The computing system 500 may include one or more processors 510 or processing modules coupled to the bus for processing information. The computing system 500 may include main memory 515, such as a random access memory (RAM) or other dynamic storage device, coupled to the bus 505 for storing information, and instructions to be executed by the processor 510. Main memory 515 may be used for storing position information, temporary variables, or other intermediate information during execution of instructions by the processor 510. The computing system 500 may include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. In some other implementations, the input device 530 has a touch screen display 535. The input device 530 can include a cursor control, such as a mouse, a trackball, or cursor direction keys, for communicating direction information and command selections to the processor 510 and for controlling cursor movement on the display 535.

According to various implementations, the processes described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 400 to perform the illustrative processes described herein. One or more processors in a multi-processing arrangement may be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded or stored on one or more computer storage media such as non-transitory computer-readable media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a non-transitory computer-readable medium, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium may be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" may encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. A processor can receive instructions and data from a read-only memory or a random access memory or both. The essential elements of a computer are a processor for performing actions in accordance with instructions and one or more memory devices for storing instructions and data. A computer may include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems may be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

What is claimed is:

1. A computer-implemented method of distributing content items to a web page via a computer network, the method comprising:
  receiving from a client device, by one or more data processing systems, a request for content items, the request including information specifying a dimensional size of a space in which the content items will be rendered and client device information;
  retrieving, by one or more data processing systems, information about rendered content sizes from a datastore, the information based on measurement results of rendering content items on a plurality of devices with a plurality of configurations;
  estimating, by the one or more data processing systems using the retrieved information and the client device information, a first number of content items that fit in the space when rendered;
  receiving, by the one or more data processing systems from a content provider, responsive to the estimation, a second number of content items, the second number larger than the first number;
  providing, by the one or more data processors to the client device in response to the request, the second number of content items; and
  receiving data indicating that a third number of content items from the provided second number of content items were rendered,
  the third number smaller than or equal to the second number.

2. The computer-implemented method of claim 1, further comprising pipelining the second number of content items for rendering in the space.

3. The computer-implemented method of claim 1, further comprising determining a performance metric, wherein the performance metric is based on the third number of content items that were actually rendered in the space.

4. The computer-implemented method of claim 1, wherein the measurement results comprise at least one of a parameter of the space, a parameter of the content item, a dimension of a user interface, or a parameter of the plurality of configurations.

5. The computer-implemented method of claim 1, wherein the space comprises a slot of a web page, and wherein the estimating is further based on a probabilistic distribution of a plurality of content items to be fit in the slot.

6. The computer-implemented method of claim 5, further comprising optimizing an appearance of a content item of the second number of content items based on the probabilistic distribution.

7. The computer-implemented method of claim 5, further comprising maximizing the second number of content items based on the probabilistic distribution.

8. The computer-implemented method of claim 1, wherein the data indicating a third number of content items includes data indicating which content items of the second number of content items were rendered, wherein the content items of the second number of content items that were rendered were displayed on at least one rendering of the web page.

9. A computer-implemented method comprising:
  transmitting, by a client device to one or more data processing systems, a request for a content items, the request including information specifying a dimensional size of a space in which the content items will be rendered and client device information;
  receiving, by the client device from one or more data processing systems, a second number of content items, the second number of content items larger than a first number, the first number estimated by one or more data processing systems to be a number of content items that fit in the space when rendered, the estimation performed using information about rendered content sizes retrieved from a datastore and the client device information, the information based on measurement results of rendering content items on a plurality of devices with a plurality of configurations, the second number of content items received by the one or more data processing systems from a content provider;
  selecting, by the client device, a third number of content items of the received second number of content items to render, the third number smaller or equal to the second number;
  rendering, by the client device, the third number of content items of the received second number of content items; and
  transmitting, by the client device to one or more data processing systems, data indicating that the third number of content items from the received second number of content items were rendered.

10. The computer-implemented method of claim 9, wherein the selecting of the third number of content items is based, at least in part, on optimizing an appearance of the third number of content items based on the dimensional size of the space.

11. The computer-implemented method of claim 9, wherein the selecting of the third number of content items is based, at least in part, on maximizing the third number of content items based on the dimensional size of the space.

12. The computer-implemented method of claim 9, wherein the indication of the third number of content items includes an indication of which content items of the second number of content items were rendered.

13. The computer-implemented method of claim 9, wherein the second number of content items comprises rich media content items.

14. A nontransitory computer readable storage device storing instructions that when executed by one or more data processors, cause the one or more data processors to perform operations comprising:
  receiving from a client device, by one or more data processing systems, a request for content items, the request including information specifying a dimensional size of a space in which the content items will be rendered and client device information;
  retrieving, by one or more data processing systems, information about rendered content sizes from a datastore, the information based on measurement results of rendering content items on a plurality of devices with a plurality of configurations;
  estimating, by the one or more data processing systems using the retrieved information and the client device information, a first number of content items that fit in the space when rendered;
  receiving, by the one or more data processing systems from a content provider, responsive to the estimation, a second number of content items, the second number larger than the first number;

providing, by the one or more data processors to the client device in response to the request, the second number of content items; and receiving data indicating that a third number of content items from the provided second number of content items were rendered, the third number smaller than or equal to the second number.

15. The computer readable storage device of claim 14, wherein the instructions further cause the one or more data processors to perform operations comprising pipelining the second number of content items for rendering in the space.

16. The computer readable storage device of claim 14, wherein the instructions further cause the one or more data processors to perform operations comprising determining a performance metric, wherein the performance metric is based on the third number of content items that were rendered in the space.

17. The computer readable storage device of claim 14, wherein the measurement results comprise at least one of a parameter of the space, a parameter of the content item, a dimension of a user interface, or a parameter of the plurality of configurations.

* * * * *